United States Patent [19]
Srivastava

[11] Patent Number: 5,926,221
[45] Date of Patent: Jul. 20, 1999

[54] METHOD AND APPARATUS FOR IMPROVED VIDEO CODING USING A CENTER-BIASED ORTHOGONAL SEARCH TECHNIQUE AND A ZERO BLOCK PREDICTOR MODULE

[75] Inventor: Aditya Srivastava, Dallas, Tex.

[73] Assignee: Texas Instruments Incorporated, Dallas, Tex.

[21] Appl. No.: 08/756,597

[22] Filed: Nov. 27, 1996

Related U.S. Application Data

[62] Division of application No. 08/590,646, Jan. 24, 1996, abandoned
[60] Provisional application No. 60/002,528, Aug. 18, 1995.

[51] Int. Cl.[6] ................................................. H04N 11/02
[52] U.S. Cl. ........................... 348/395; 348/407; 348/420
[58] Field of Search ..................... 348/395, 393, 348/394, 400–403, 407, 409, 415, 416, 420, 699; 382/232, 236, 238, 248, 249, 250; H04N 7/12, 11/02

[56] References Cited

U.S. PATENT DOCUMENTS

| | | | |
|---|---|---|---|
| 4,691,230 | 9/1987 | Kaneko et al. ........................... | 348/699 |
| 5,130,797 | 7/1992 | Murakami et al. ....................... | 348/699 |
| 5,173,772 | 12/1992 | Choi ......................................... | 348/701 |
| 5,226,093 | 7/1993 | Iwase ....................................... | 348/416 |
| 5,475,433 | 12/1995 | Jeong ....................................... | 348/419 |
| 5,477,272 | 12/1995 | Zhang et al. ............................. | 348/407 |
| 5,485,279 | 1/1996 | Yonemitsu et al. ...................... | 348/411 |
| 5,512,939 | 4/1996 | Zhou ........................................ | 348/399 |
| 5,557,341 | 9/1996 | Weiss et al. ............................. | 348/699 |
| 5,612,751 | 3/1997 | Kondo ..................................... | 348/699 |

OTHER PUBLICATIONS

Puri, et al., "An Efficient Block–Matching Algorithm For Motion–Compensated Coding", Proc. IEEE 1987, pp. 1063–1066.
"Video Coding for Narrow Telecommunication Channels at, 64 kbit/s", International Telecommunication Union, Draft H. 263, Apr. 7, 1995, pp. 1–51.

*Primary Examiner*—Tommy P. Chin
*Assistant Examiner*—Y. Lee
*Attorney, Agent, or Firm*—Robert L. Troike; Richard L. Donaldson

[57] ABSTRACT

A video encoder optimized so as to be implemented using general purpose DSPs or as software executable on a general purpose microprocessor includes a modified motion detector module (50) which classifies blocks in the currently processing image as moving or stationary. Blocks classified as moving are then processed by an modified motion compensation module (52) which uses a center-biased orthogonal searching procedure to match the block with a previously processed image. A zero block detector module (54) determines whether the block will generate a zero-valued block after being processed by a transform module 18 and a quantization module 20. If a zero-valued block is predicted, the transformation module 18 and the quantization module 20 are bypassed.

3 Claims, 6 Drawing Sheets

METHOD AND APPARATUS FOR IMPROVED VIDEO CODING USING A CENTER-BIASED ORTHOGONAL SEARCH TECHNIQUE AND A ZERO BLOCK PREDICTOR MODULE

This is a division, of application Ser. No. 08/590,646, filed Jan. 24, 1996, abandoned which is an application under 111(a) filed not more than 12 months after prior provisional application Ser. No. 60/002,528, filed Aug. 18, 1995.

TECHNICAL FIELD OF THE INVENTION

This invention relates to image processing and in particular to a method and system for improved encoding of video data.

BACKGROUND OF THE INVENTION

Image compression and decompression are used in a wide range of applications including video conferencing systems, video phones, and motion picture transmission. The conventional approach in these applications has been to use dedicated hardware for video coding, i.e., image compression and decompression. The use of dedicated hardware, typically digital signal processors (DSPs), is required because the video coding process is computationally expensive and slow on general-purpose hardware. As a result, widespread use of these applications has been stymied by the costs associated with deploying the specialized hardware required to achieve good performance. It has been predicted, however, that these applications, in particular video conferencing, will become desktop commodities in the next few years. Improvements to the video coder and the video coding process are necessary to make this prediction a reality.

Figure 1:
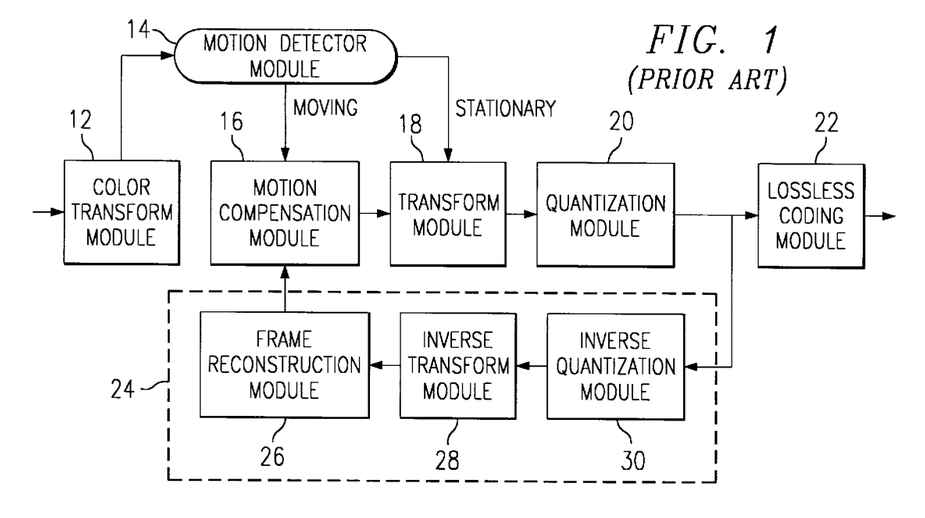
FIG. 1 is a block diagram depicting a prior art video encoder.

A diagram illustrating a video coding process in accordance with International Telecommunication Union (ITU) standard H.263, hereinafter referred to as the ITU H.263 standard, for video coding and encoding at very low bit-rates, such as at 28K bits per second, is shown in FIG. 1.

The video encoder shown in FIG. 1 includes a color transform module 12, a motion detector module 14, a motion compensation module 16, a transform module 18, a quantization module 20, and a coding module 22. Also included is a feedback module 24 which includes an inverse quantization module 30, an inverse transformation module 28, and a frame reconstruction module 26.

Figure 2:
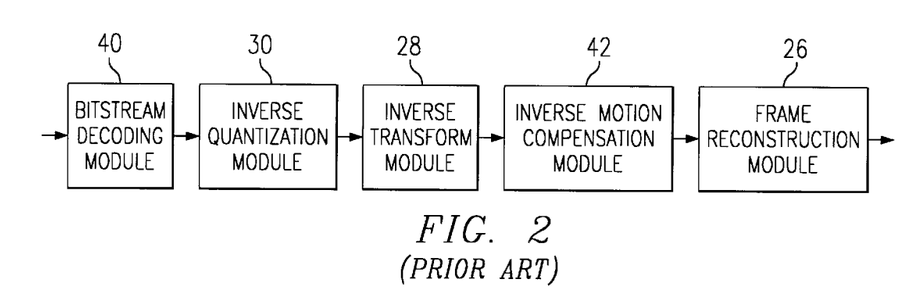
FIG. 2 shows a block diagram illustrating a prior art video decoder.

A video decoder, as shown in FIG. 2, performs the reverse process of the video coder and includes a bit-stream decoding module 40, the inverse quantization module 30, the inverse transform module 28, an inverse motion compensation module 42, and the frame reconstruction module 26.

In the video coding process, motion compensation performed by the motion compensation module 16 is the most time consuming phase. The transformation and quantization phases, performed by the transformation module 18 and the quantization module 20, respectively, are also expensive phases to perform.

However, with processor speeds doubling every two years, it is possible for software-only solutions to attain good performance and quality and to lower the costs associated with applications which require video processing enough make image processing a commodity item in desktop computing environments.

To overcome the computational requirements of the various stages, the video processing applications in prior art systems employ dedicated DSPs to make the various computationally expensive stages execute faster. Use of dedicated hardware is a weakness of current video conferencing systems. Designing new hardware as the video coding standards change and evolve is expensive, time-consuming and substantially increases the cost of delivered systems. Not only do the high costs associated with dedicated hardware present a barrier against image processing applications becoming a desktop commodity solutions, but they also go against the latest trend in hardware/software solution to use open systems.

Thus, what is needed is a method and system to overcome the limitations and weaknesses of current video processing application implementations. In particular, what is needed is a method and system for video encoding which is computationally more efficient than those of the prior art and which are amenable to implementation using low-cost general-purpose DSPs or software-only solutions.

SUMMARY OF THE INVENTION

The present invention includes a video coding process which can be implemented on low-cost, general purpose DSPs or as a software only solution on a general purpose microprocessor to get acceptable performance. The present invention modifies the overall video coding process and augments it with optimizations which reduce the overall video coding computation time thereby making it viable to use the low-cost DSP solutions or a software-only solution, both of which permit acceptable performance on today's desktop CPUs.

One aspect of the present invention includes optimizations of the motion detection stage.

Another aspect of the present invention includes optimizations of the motion compensation stage.

Yet another aspect of the present invention includes the addition of a zero block prediction stage.

These and other features of the invention that will be apparent to those skilled in the art from the following detailed description of the invention, taken together with the accompanying drawings.

DETAILED DESCRIPTION OF THE INVENTION

Figure 3:
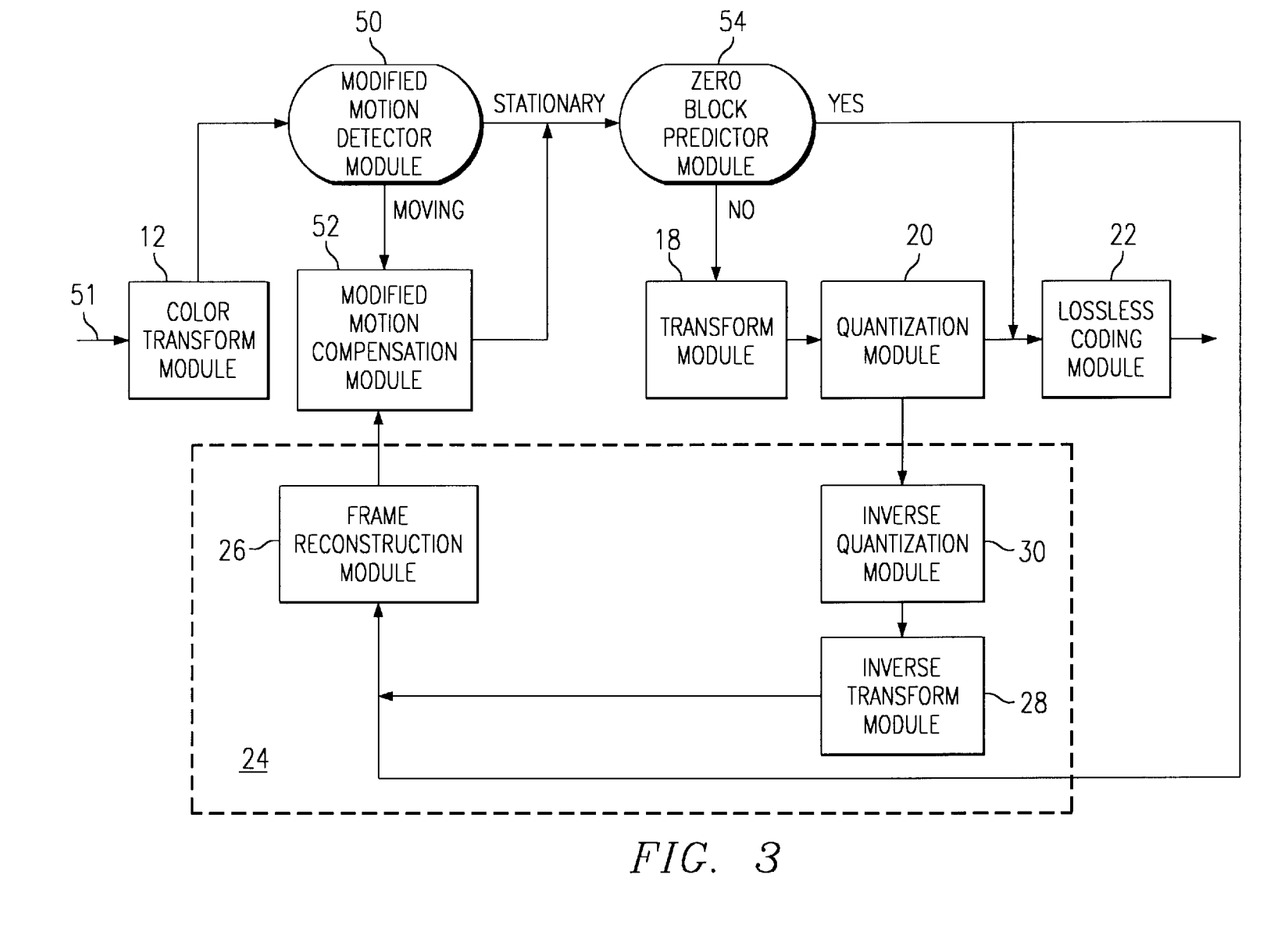
FIG. 3 illustrates a first embodiment of a video encoder in accordance with the present invention.

A video coder in accordance with the present invention, as shown in FIG. 3, includes several improvements to the video coder and video coding process of the prior art, shown in FIG. 1. The improvements shown in the video coder in accordance with the present invention as depicted in FIG. 3 provide for increased performance over video coders and video coding processes of the prior art. It is contemplated that the video coder and video coding process in accordance with the present invention are useful in any application using video coding techniques.

The present invention is implemented in C++ using Microsoft's Visual C++ compiler on a workstation which included a Pentium processor. It is contemplated, however, that use of other languages and hardware configurations would be apparent to those skilled in the art.

The overall structure of the video coder in accordance with the present invention is shown in FIG. 3. As discussed hereinabove, the motion compensation stage and the transformation stage are among the most time consuming stages in a typical video coding process. The present invention provides for improvements to the motion detection stage as performed by modified motion detector module 50. The modified motion detector module 50 in accordance with the present invention determines whether to bypass the motion compensation stage performed by the modified motion compensation module 52. The modified motion compensation module 52 also includes improvements to the motion compensation stage over that of the motion compensation module 16 of the prior art.

The video coding process in accordance with the present invention also includes the addition of a zero block prediction stage, performed by zero block predictor module 54. The zero block predictor module 54 determines whether or not to bypass the transformation and quantization stages. Each of these features are discussed in detail hereinbelow.

Figure 4:
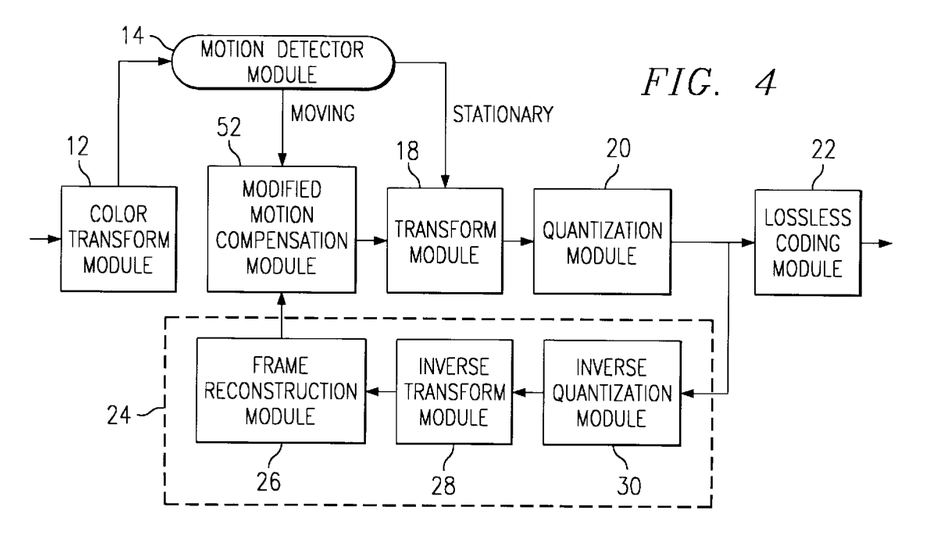
FIG. 4 depicts a second embodiment of a video encoder in accordance with the present invention.
Figure 5:
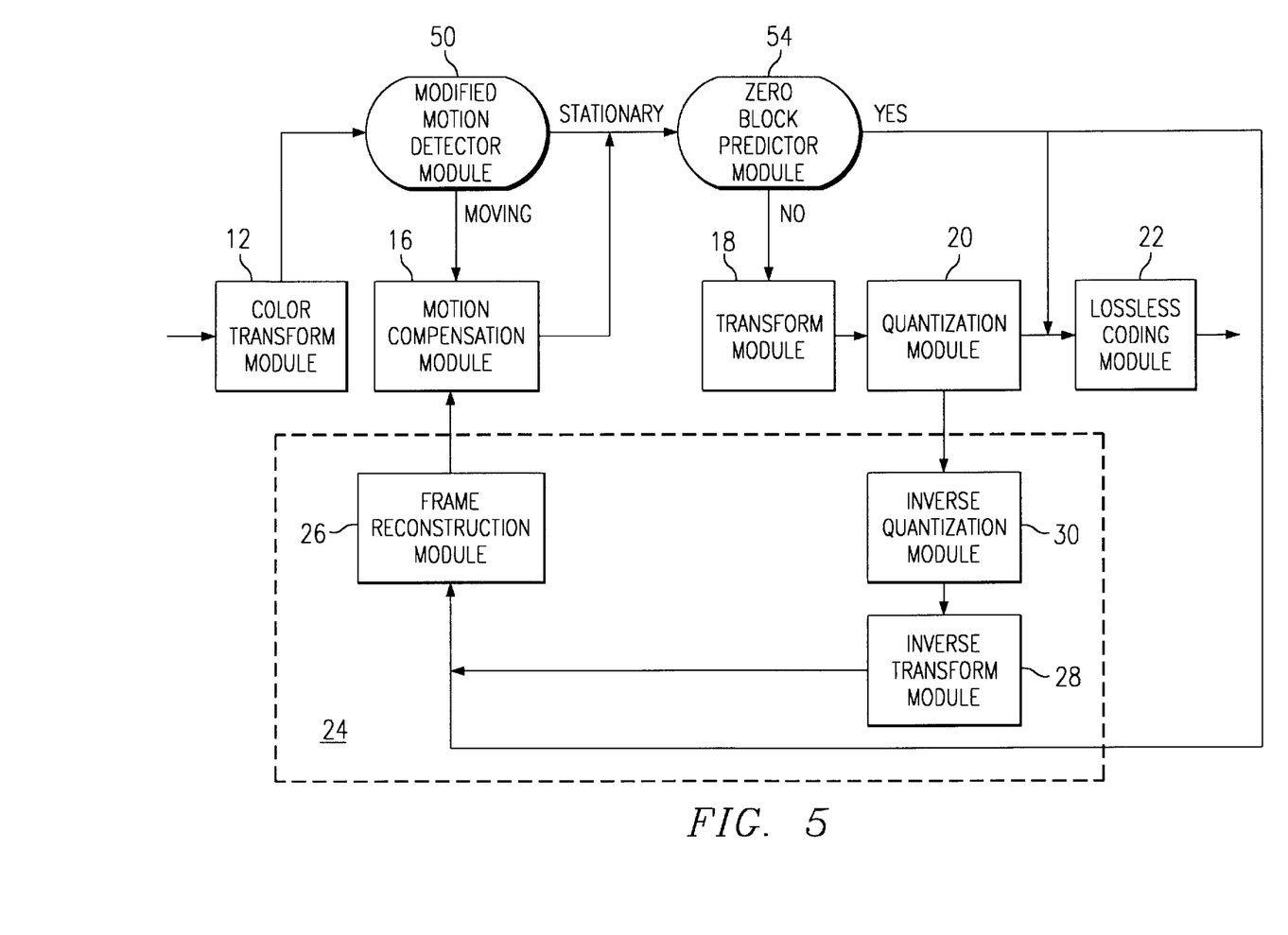
FIG. 5 shows a third embodiment of a video encoder in accordance with the present invention.

It is contemplated that other embodiments, in addition to that shown in FIG. 3, of the present invention are possible which also provide improvements to the video coder of the prior art. Another embodiment of the video coder in accordance with the present invention is shown in FIG. 4, which includes the modified motion compensation module 52. FIG. 5 illustrates yet another embodiment of video coder in accordance with the present invention which includes the modified motion detector module 50 and the zero block predictor module 54.

Figure 6:
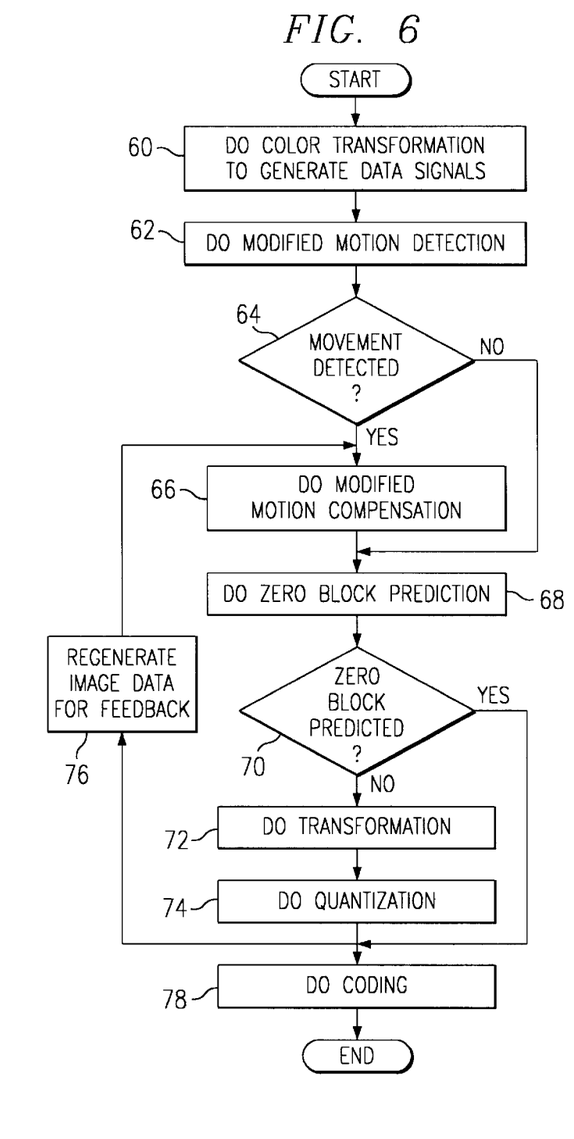
FIG. 6 is a flow diagram illustrating the operation of a video encoder in accordance with the present invention.

The operation of the video encoder shown in FIG. 3 is illustrated in FIG. 6. At block 60, the color transformation module 12 generates data signals from the video image signals input at 51. The data signals are then input to the modified motion detector module 50 as shown at block 62 which determines whether movement is detected in the represented image. If, at decision block 64, movement is detected, the modified motion compensation module 52, as shown at block 66, compensates for that movement and operation continues at block 68. If, at decision block 64, movement is not detected, the motion compensation stage performed by the modified motion compensation module 52 is bypassed and operation continues at block 68.

At block 68, the zero block predictor module 54 determines whether the currently processing macroblock of data signals will generate a zero-valued macroblock after the transformation and quantization stages performed by the transform module 18 and the quantization module 20, respectively. If, at decision block 70, a zero-valued macroblock is predicted, the transformation and quantization stages are bypassed and operation continues at block 78.

If, at decision block 70, a zero-valued macroblock is not predicted, operation continues at block 72 where the data signals are transformed by the transform module 18. In the present invention, the transform module 18 performs a discrete cosine transformation but, it is contemplated that other transformations may be used. The transformed data signals are then quantized at block 74 by the quantization module 20. At block 76, the data signals of the currently processed image are used to generate an interpolated image which is fed back into the modified motion compensation module 52 at block 66.

The quantized data signals generated at block 74 are encoded at block 78 for further processing by the application which incorporates or uses the video coder of the present invention.

Figure 7:
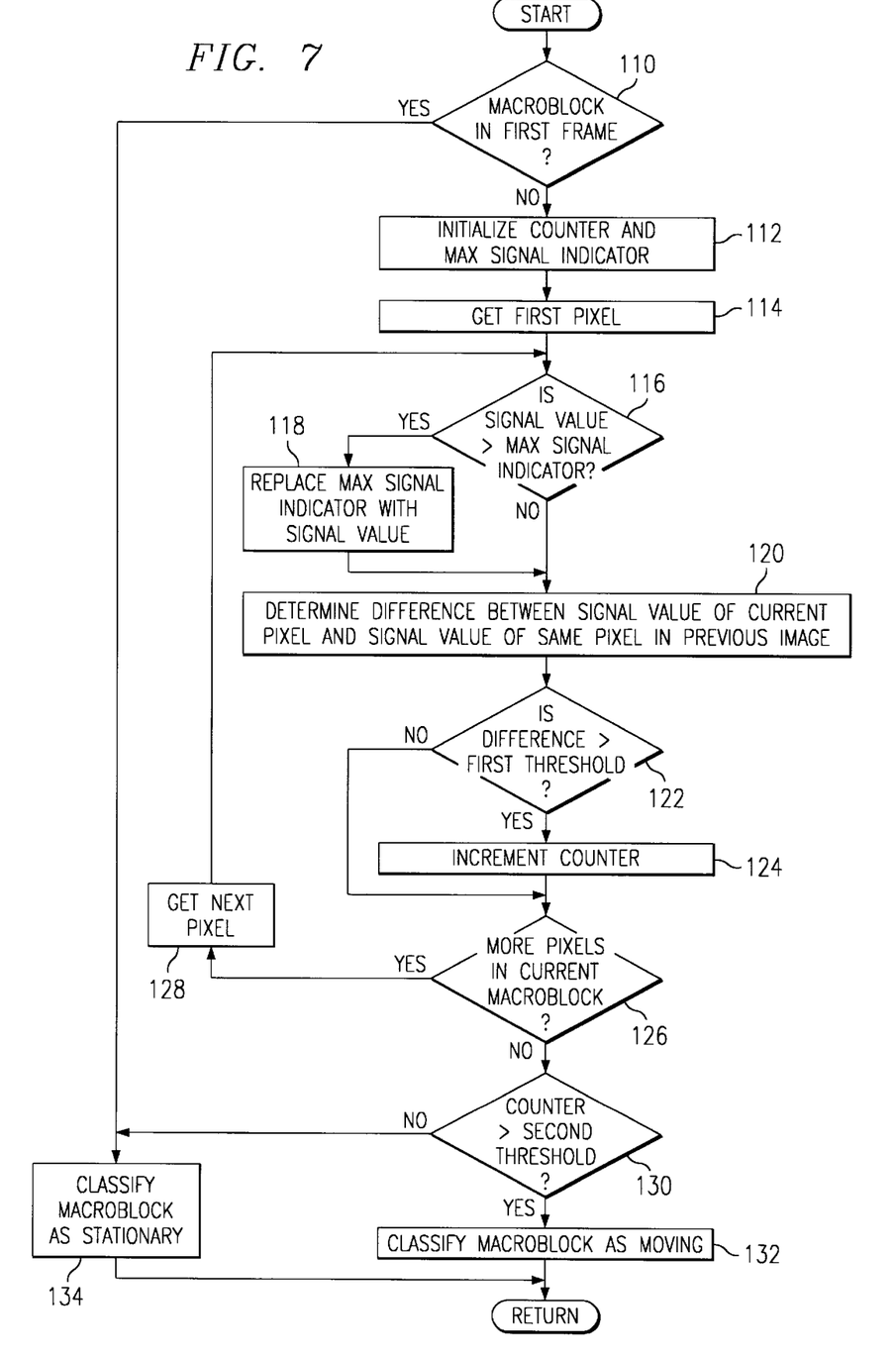
FIG. 7 shows a flow diagram illustrating the operation of a modified motion detector module in accordance with the present invention.

In the motion detection stage performed by the modified motion detection module 50, the operation of which is illustrated in detail in FIG. 7, the macroblocks of the currently processing image processed are classified as either moving or stationary. In order to classify the macroblocks, the modified motion detection module 50 determines if the macroblock has moved based upon predetermined motion criteria. The modified motion detector module 50 then, using the predetermined motion criteria, compares the currently processing macroblock with a macroblock which is in the same location in the previous image, the interpolated image generated by the feedback module 24, as the currently processing macroblock is in the current image.

The pixel-by-pixel absolute difference between the macroblock in the currently processing image and the macroblock at the same location in the previous image is calculated. If the difference between a pixel in the currently processing image and a pixel in the same location in the previous image is above a predetermined threshold, then that pixel is classified as moving within that macroblock. If the number of pixels classified as moving are above a second predetermined threshold, then the macroblock is classified as moving, otherwise the macroblock is classified as stationary. If the macroblock is stationary then the motion compensation phase is skipped entirely and computation proceeds as shown in FIG. 6.

Returning to FIG. 7, if, at decision block 110, the modified motion detector module 50 is processing a macroblock in the first frame of data representing the current image (i.e., if it is an INTRA coded block), that macroblock is classified as stationary at block 134 and processing by the modified motion detector module 50 terminates. If, at decision block 110, the current macroblock is not the first macroblock being processed, processing continues at block 112 where a counter and a maximum data signal indicator are initialized. Operation then continues at block 114 where the first pixel in the currently processing macroblock is retrieved.

If, at decision block 116, the signal value of the current pixel in the currently processing macroblock is greater then the current value of the maximum data signal indicator, then the value of the maximum data signal indicator is replaced with the signal value at block 118 and operation continues at block 120. If, at decision block 116, the signal value of the current pixel is not greater than the current value of the maximum data signal indicator then operation continues at block 120 where the modified motion detector module 50 determines the difference between the signal value of the current pixel and the signal value of the pixel in the same location in the previous image.

If, at decision block 122, that difference is greater than the first predetermined threshold, the counter is incremented at block 124 and operation continues at decision block 126. If, at decision block 122, the difference is not greater that the first predetermined threshold, operation also continues at decision block 126 where, if there are more pixels in the currently processing macroblock, the next pixel is retrieved at block 128 and operation continues at decision block 116. If, at decision block 126, all pixels in the current macroblock have been processed, a determination is made at decision block 130 as to whether the counter is above the second predetermined threshold.

If, at decision block 130, the counter is above the second predetermined threshold, the macroblock is classified as moving at block 132. If, at decision block 130, the counter is not above the second predetermined threshold, the macroblock is classified as stationary at block 134. Operation in the modified motion detector module 50 then terminates.

Returning to FIG. 6, if, as shown at decision block 64, the modified motion detector module 50 classifies the current macroblock as moving, the motion compensation stage performed by the modified motion compensation module 52 is not bypassed. The modified motion compensation module 52 operates as shown in FIG. 8.

The motion compensation module 16 in video coders of the prior art and the modified motion compensation module 52 in accordance with the present invention both uses a search procedure to find a best matching macroblock in the previous image then both perform a half-pel search around the best matching macroblock in an interpolated version of the represented image. If a full search block matching procedure is used, as in the motion compensation module 16 in video coders of the prior art, the motion compensation phase is an order of magnitude more expensive (in terms of adds and multiples) than any other phase of the video coding process. Therefore, to reduce the complexity of the motion compensation stage, the modified motion compensation module 52 of the present invention includes several improvements.

Figure 8:
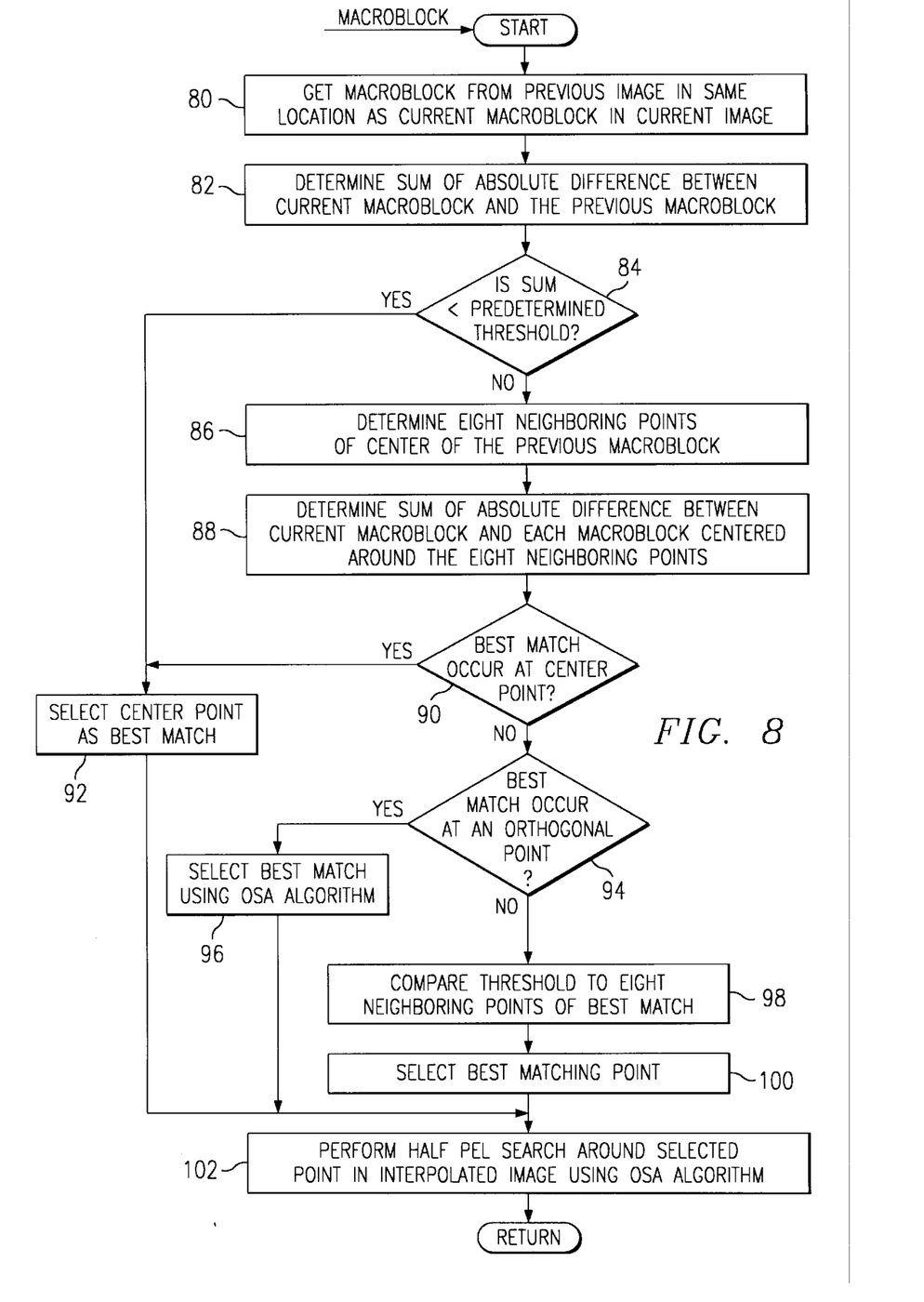
FIG. 8 illustrates a flow diagram showing the operation of a modified motion compensation module in accordance with the present invention.

As shown in block 80 in FIG. 8, the modified motion compensation module 80 first retrieves the macroblock from the previous image which is in the same location in the previous image as the currently processing macroblock is in the current image. The modified motion compensation module 52 then determines, at block 82, the sum of the absolute difference between the retrieved macroblock from the previous image and the currently processing macroblock in the current image.

If, at decision block 84, the sum of absolute difference between the macroblock in the currently processing image and the macroblock at the same location in the previous image is below a certain predetermined threshold, then no further search is done and processing continues at block 92 where the retrieved macroblock in the previous image is chosen as the best matching block.

If, at decision block 84, the sum is above the predetermined threshold, processing continues at block 86 where eight neighboring points around the center of the retrieved macroblock in the previous image are determined. The modified motion compensation module 52 then determines, at block 88, the sum of the absolute difference between the pixels in the currently processing macroblock and each macroblock in the previous image centered around one of the eight neighboring points.

This center biased orthogonal search algorithm (C-OSA) for block matching used by the motion compensation module 52 of the present invention is an optimization of the orthogonal search algorithm (OSA) described in the article entitled "An Efficient Block-Matching Algorithm for Motion-Compensated Coding" by A. Puri, et al. and published in Proceeding IEEE ICASSSP 1987 on pages 25.4.1–25.4.4. The C-OSA used in the modified motion compensation module 52 in the present invention performs a quick search on a set of eight neighboring points (+or −one pixel in each direction and along the diagonals) centered around the search point in the retrieved macroblock in the previous image.

In the center-biased search procedure used in the modified motion compensation module 52 of the present invention, if, at decision block 90, the best-match occurs at the center, then no further search is done and processing continues at block 92 where the macroblock centered around that best matching point is chosen. If, however, at decision block 90, the best match occurs at one of the eight neighboring points, processing continues at decision block 94.

If, at decision block 94, the best match is at an orthogonal point (a point which is + or −p pixel, where p is equal to 7, in any direction from the center point, i.e., not one of the points along a diagonal) then the searching procedure performed by the modified motion compensation module 52 in the present invention proceeds as in the OSA procedure described in Puri, et al. If, however, at decision block 94, the best match occurs instead at one of the eight neighboring points, then a new set of eight neighboring points is selected with that best matching point as the center point. The best match amongst this new set of eight neighboring points is returned at block 100 as the result. Note that in the new set of eight neighboring points, not all eight points have to be recomputed since some were already computed previously.

It is worthwhile noting that the approach taken by the modified motion compensation module 52 favors motion compensation on images where there is relatively little motion between successive images, which is typical of video conferencing applications. The C-OSA procedure used by the modified motion compensation module 52 of the present invention includes a quick test to find the best matching block in a very small search area. In the worst case the modified motion compensation module 52 of the present invention does a full orthogonal search which is still less complex and produces good results. The complexity of the C-OSA used in the modified motion compensation module 52 of the present invention is 16+4 log 2 w, where w is search distance in pixels, typically plus or minus 15 pixels.

Finally, as shows at block 102, the modified motion compensation module 52 of the present invention applies the OSA procedure described in Puri, et al. to the half-pel motion compensation search. The half-pel search is done on the interpolated image in a search area of plus or minus one pixel in all directions and along the diagonals. Surprisingly, this took more than a substantial proportion of the overall motion compensation time used by the modified motion compensation module 52 since the full-pel search described hereinabove is already quite efficient. Applying the OSA procedure described in Puri, et al. on the half-pel search substantially reduced the number of search points. Also, the search area for border blocks is much smaller, since part of the area is not within the picture boundary, which provided additional savings in computation time.

Results obtained from the C-OSA and OSA procedures applied to full-pel and half-pel search, respectively, by the modified motion compensation module 52 were very close to an exhaustive search with no noticeable degradation of image quality and resulted in an order of magnitude speed up of motion compensation when compared to the exhaustive search. On several ITU H.263 standard test images, including the "Miss America" image, motion compensation takes less than 12% of the total computing time with less than a 0.01 dB decrease in signal-to-noise ratio.

Returning to FIG. 6, on typical image sequences, e.g., on ITU test image sequences, less than 30% of INTER coded blocks had non-zero values after the quantization stage at 74 but all blocks had to go through the expensive transformation stage at block 72. Furthermore, the non-zero valued blocks had only one or two non-zero coefficients. To exploit the above observation a zero block prediction stage at 70 performed by the zero block predictor module 54 is included after the motion compensation stage at 66.

The modified motion detector module 50, as described in the hereinabove, classifies macroblocks as either moving or stationary. The modified motion detector module 50 also records the maximum signal value and the number of stationary pixels in the entire macroblock. Based on a quantization value which changes as processing progresses, this information is used by the zero block predictor module 50 to determine or predict whether a macroblock will have all zero values after the transformation and quantization stages. If a zero-valued block is predicted, then the transformation and quantization stages, at 72 and 74, respectively, are skipped and a zero value block is generated.

Figure 9:
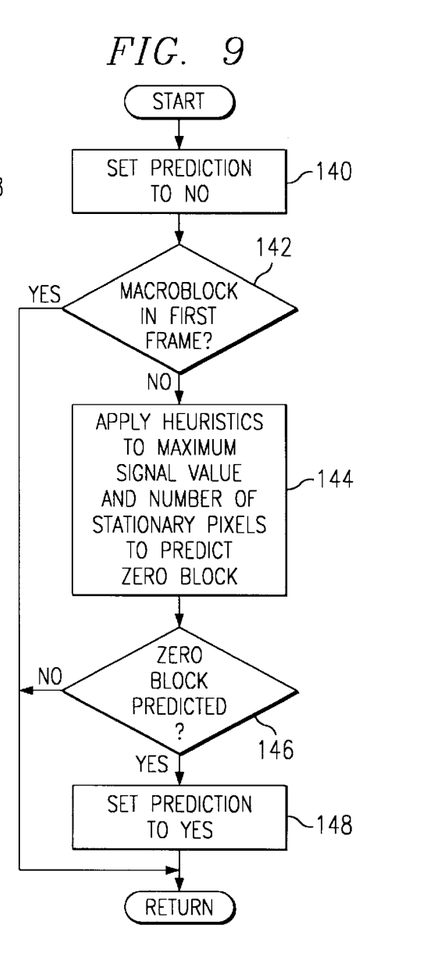
FIG. 9 is a block diagram depicting the operation of a zero block predictor module in accordance with the present invention.

The operation of the zero block predictor module 54 is shown in FIG. 9. At block 140, the prediction is set to "no". If, at decision block 142, a macroblock within the first frame is being processed, processing in the zero block predictor module 54 terminates. Otherwise, at block 144, the zero block predictor module 54 applies heuristics using the maximum signal value, the number of stationary pixels, and the current quantization value to determine if the current macroblock will generate a zero-valued block after the transformation and quantization stages. If, at decision block 146, a zero-valued block is predicted, then the prediction is set to "yes" at block 148 and processing in the zero block predictor module 54 terminates.

The heuristics used by the zero block predictor module 54 are only applied to INTER coded blocks. On average this saves about 30% of the blocks from going through the transformation and quantization stages. However, because of the conservative nature of the heuristic used by the zero block predictor module 54, 40% of the blocks which would have been zero valued blocks still went through the expensive transformation and quantization stages. It is contemplated, however, that the percentage of the blocks that are predicted as zero-valued blocks by the zero block predictor module 54 can be increased as the heuristics used are improved.

Before this optimization was applied, the transformation and quantization stages consumed about 30% of the total processing time. This reduced to about 18% after the above optimizations were applied. It is contemplated that the processing time can be further reduced if improved heuristics for predicting zero-valued blocks are applied. The overall video coding process in the present invention achieves about a 5–6 fold increase over the video coding process the ITU H.263 standard. Thus, the video coding process in accordance with the present invention is computationally more efficient and amenable to implementation using low-cost DSPs or software-only solutions.

The techniques and concepts described in this invention were developed specifically for the video coding process used by video conferencing systems. However, it is contemplated that the present invention is also applicable to any application which uses video coding techniques for image compression.

OTHER EMBODIMENTS

Although the present invention and its advantages have been described in detail, it should be understood that various changes, substitutions and alterations can be made herein without departing from the spirit and scope of the invention as defined by the appended claims.

What is claimed is:

1. A video encoder comprising:
   a color transform module for accepting input video signals and for generating a first set of data signals representing a current image, said current image including a plurality of pixels;

a modified motion detector module coupled to said color transform module and responsive to said first set of data signals for generating a classification signal classifying said current image as moving or stationary, a maximum value signal and a counter signal indicating how many of said pixels are classified as stationary;

a modified motion compensation module responsive to said classification signal generated by said modified motion detector module and a second set of data signals representing a previous image generated by a feedback module for compensating for motion in said current image using a center-biased orthogonal search technique;

a zero block predictor module responsive to said first set of data signals, said maximum value signal and said counter signal for generating a zero block signal to indicate whether computation on said first set of data signals will generate non-zero data;

a computational module responsive to said zero block signal for generating digitized data signals from said first set of data signals;

said feedback module responsive to said digitized data signals for generating said second set of data signals for input to said motion compensation module; and a coding module responsive to said digitized data signals for generating encoded data signals.

2. The system of claim 1 wherein said modified motion compensation module is operable to perform a full picture element search in accordance with said center-biased orthogonal search technique.

3. The system of claim 1 wherein said modified motion compensation module is operable to perform a half picture element search in accordance with an orthogonal search technique.

* * * * *